United States Patent [19]
Cohen et al.

[11] Patent Number: 5,624,729
[45] Date of Patent: Apr. 29, 1997

[54] INCREASED PILE DENSITY COMPOSITE ELASTIC MATERIAL

[75] Inventors: Bernard Cohen, Duluth; Robert J. Roeder, Roswell; Jay S. Shultz, Roswell; Raju Venkatapathy, Roswell, all of Ga.

[73] Assignee: Kimberly-Clark Corporation, Neenah, Wis.

[21] Appl. No.: 384,064

[22] Filed: Feb. 6, 1995

Related U.S. Application Data

[63] Continuation of Ser. No. 852,447, Mar. 16, 1992, abandoned, which is a continuation-in-part of Ser. No. 414,482, Sep. 29, 1989, abandoned.

[51] Int. Cl.$^6$ .................................................. B05D 1/14
[52] U.S. Cl. ......................... 428/90; 428/95; 428/96; 428/97
[58] Field of Search ............................ 428/90, 95, 96, 428/97

[56] References Cited

U.S. PATENT DOCUMENTS

| | | | |
|---|---|---|---|
| 2,951,005 | 8/1960 | Hervey | 154/123 |
| 4,741,949 | 5/1988 | Morman et al. | 428/224 |

Primary Examiner—Christopher Raimund
Attorney, Agent, or Firm—Karl V. Sidor

[57] ABSTRACT

Disclosed is a lanate composite elastic material made by a method including the steps of applying a tensioning force to elongate at least one pressure sensitive elastomer adhesive sheet; inserting substantially individualized fibrous materials into the elastic sheet by mechanical needling the elastomer sheet while it is maintained in an elongated condition; and releasing the tensioning force so the attached fibrous materials are positioned closer together by the recovery of the elastic sheet. The resulting lanate composite elastic material has stretch and recovery properties, bulk, and desirable insulation properties. One or more layers of the lanate composite material may be combined with other layers of material to create a multi-layer structure. Also disclosed is a method of making in increased pile density composite elastic material including the step inserting substantially individualized fibrous materials into an elongated pressure sensitive elastomer adhesive sheet by stitchbonding, malipole stitchbonding, or tufting or adhering substantially individualized fibrous materials to the elongated elastomer sheet by flocking techniques. The density of attached fibrous materials in the resulting increased pile density composite elastic material is greater than could be achieved by conventional fiber insertion or adherence techniques while still maintaining desirable elastic properties and bulk.

29 Claims, 1 Drawing Sheet

FIG. 1

INCREASED PILE DENSITY COMPOSITE ELASTIC MATERIAL

This application is a continuation application of application Ser. No. 07/852,447 filed on Mar. 16, 1992, now abandoned which is a continuation-in-part application of application Ser. No. 07/414,482 filed on Sep. 29, 1989, abandoned.

FIELD OF THE INVENTION

The present invention relates to composite elastic materials and a method of making the same.

BACKGROUND OF THE INVENTION

There has been a continuing need for pile fabrics and lanate materials having a high degree of flexibility, elasticity, bulk and strength and which may be manufactured at a low cost. This need has persisted in spite of the fact that such fabrics could readily be utilized to manufacture a wide variety of garments of both the disposable type, such as disposable work wear and disposable diapers, or the durable type, such as pants, dresses, blouses and sporting wear, for example, sweat suits. Further, such fabrics could also be utilized in, for example, upholstery, drapery, and liner applications. Lanate materials have a woolly or fleecy structure which may be particularly well suited in applications where insulation properties are desired.

In some situations, the value of the pile fabric or lanate material relates to the density at which the fibrous materials are attached to the substrate as well as the overall flexibility and elasticity of the material. Pile fabrics and lanate materials having high densities of fibrous materials typically have richer surface textures and greater market value.

Pile fabrics and lanate materials may be formed by attaching fibrous materials such as, for example, fibers or fiber bundles to a substrate. Fibers may be inserted into a substrate utilizing processes such as, for example, mechanical needling. In some situations, pile fabrics may be formed by adhering fibers onto the surface of a substrate utilizing flocking techniques. Pile fabrics and lanate materials may also be formed by tufting or stitchbonding fiber bundles, such as, for example, yarns or threads into a substrate.

While pile fabrics and lanate materials having a high density of attached fibrous materials often have a pleasing surface appearance and feel, such fabrics may be so stiff so that the fabric is unsuitable for applications where flexibility and suppleness are desirable. For example, fabrics that are stiff and inflexible will conform poorly to the body of a wearer or to an item and are unsuitable for some apparel and upholstery applications.

When pile fabrics and lanate materials are made by attaching fibrous materials to a substrate utilizing mechanical needling, the density at which the fibrous materials may be attached to the substrate is limited by the distance between the mechanical needles. The density at which the fibrous materials are attached to the substrate may be increased by subjecting the fibrous materials and substrates to multiple passes through the mechanical needling apparatus. However, multiple passes result in matted, highly entangled materials that, in most situations, have low bulk and are essentially nonelastic. Post entanglement stretching may be used to return some elasticity to such composites, but such stretching may reduce the strength and durability of the composite material.

An elastic laminate material may be made by mechanically needling a coherent nonwoven web of textile fibers to an elastic substrate only at spaced-apart locations. One such laminate material is described in U.S. Pat. No. 4,446,189 to Romanek which discloses that a nonwoven textile fabric layer and a layer of generally elastic material are superposed and needlepunched to secure the fabric layer to the layer of generally elastic material at a plurality of needle punch locations each spaced a predetermined distance from the next adjacent needle punch location. The needle punched layers are drafted in at least one direction to permanently stretch the nonwoven textile fabric layer where it is not joined to the elastic layer. The superposed layers are allowed to relax so the elastic layer returns to substantially its original dimensions and the bulk of the stretched nonwoven textile fabric is increased between the needle punched locations.

A hydroentangled elastic nonwoven fabric may be made by stretching an elastic substrate in at least one direction before the elastic substrate is hydraulically entangled with a preformed fibrous web. A hydroentangled elastic fabric is disclosed by U.S. Pat. No. 4,775,579 to Hagy et al. and may be prepared by stretching an elastic meltblown continuous filament web in at least one direction prior to hydraulic entanglement with a preformed web of wood pulp and absorbent staple length fibers.

DEFINITIONS

The term "elastic" is used herein to mean any material which, upon application of a biasing force, is stretchable, that is, elongatable, to a stretched, biased length which is at least about 125 percent of its relaxed unbiased length, and which, will recover at least 40 percent of its elongation upon release of the stretching, elongating force. A hypothetical example would be a one (1) inch sample of a material which is elongatable to at least 1.25 inches and which, upon being elongated to 1.25 inches and released, will recover to a length of not more than 1.15 inches. Many elastic materials may be stretched by much more than 125 percent of their relaxed length, for example, 400 percent or more, and many of these will recover to substantially their original relaxed length, for example, to within 105 percent of their original relaxed length, upon release of the stretching force.

As used herein, the term "nonelastic" refers to any material which does not fall within the definition of "elastic," above.

As used herein, the terms "recover" and "recovery" refer to a contraction of a stretched material upon termination of a biasing force following stretching of the material by application of the biasing force. For example, if a material having a relaxed, unbiased length of one (1) inch is elongated 50 percent by stretching to a length of one and one half (1.5) inches, the material would be elongated 50 percent (0.5 inch) and would have a stretched length that is 150 percent of its relaxed length. If this exemplary stretched material contracted, that is recovered to a length of one and one tenth (1.1) inches after release of the biasing and stretching force, the material would have recovered 80 percent (0.4 inch) of its one-half (0.5) inch elongation. Recovery may be expressed as [(maximum stretch length−final sample length)/(maximum stretch length−initial sample length)]×100.

As used herein, the term "percent elongation" refers to the relative increase in the length of an elastic material during tensile testing. Percent elongation may be determined utilizing tensile testing equipment such as, for example, an Instron Model 1122 Universal Testing Instrument. Percent elongation is expressed ratio of the difference between the stretched length and the initial length of a sample divided by the initial length of the sample utilizing the following equation:

percent elongation=[(stretched length–initial length)/(initial length)]*100

As used herein, the term "nonwoven web" means a web having a structure of individual fibers or threads which are interlaid, but not in an identifiable, repeating manner. Nonwoven webs have been, in the past, formed by a variety of processes such as, for example, meltblowing processes, spunbonding processes and bonded carded web processes.

As used herein, the term "sheet" means a layer which may either be a film or a nonwoven web.

As used herein, the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin, the disclosure of which is hereby incorporated by reference.

As used herein, the term "microfibers" means small diameter fibers having an average diameter not greater than about 100 microns, for example, having an average diameter of from about 0.5 microns to about 50 microns, or more particularly, microfibers may have an average diameter of from about 4 microns to about 40 microns.

As used herein, the term "spunbonded fibers" refers to small diameter fibers which are formed by extruding a molten thermoplastic material as filaments from a plurality of fine, usually circular, capillaries of a spinnerette with the diameter of the extruded filaments then being rapidly reduced as by, for example, eductive drawing or other well-known spun-bonding mechanisms. The production of spun-bonded nonwoven webs is illustrated in patents such as, for example, in U.S. Pat. No. 4,340,563 to Appel et al., and U.S. Pat. No. 3,692,618 to Dorschner et al. The disclosures of these patents are hereby incorporated by reference.

As used herein, the term "increased pile density" refers to a pile or collection of fibrous materials such as fibers or fiber bundles that are attached to an elastic sheet while the elastic sheet is stretched in at least one direction so that, upon recovery of the elastic sheet, the fibrous materials are positioned closer together than before recovery of the elastic sheet. Upon recovery of the elastic sheet, the fibrous materials are typically positioned from about 10 percent to about 300 percent closer together, for example, from about 25 to about 100 percent closer together than before recovery of the elastic sheet. Factors that affect the positioning of the fibrous materials closer together include, for example, the elongation at which the elastic sheet is maintained while the fibers or fiber bundles are attached to the elastic sheet, the retractile force of the elastic sheet, the physical proximity and/or size of the fibers or fiber bundles attached to the elastic sheet, and the volume occupied by any fibers or fiber bundles which are inserted into the elastic sheet.

As used herein, the term "increased pile density composite elastic material" refers to an elastic material having at least one elastic sheet and fibrous materials such as fibers (e.g., synthetic fibers, natural fibers, or monofilament strands) or fiber bundles (e.g., yarns, threads, or multifilament strands) projecting in a substantially perpendicular direction from the elastic sheet to form a pile of fibrous materials which may be in the form of strands or loops that are substantially parallel with one another. The elastic sheet and the fibrous materials may be substantially united by inserting the fibrous materials into the elastic sheet utilizing stitchbonding, malipole stitchbonding, or tufting techniques. Alternatively, the elastic sheet and the fibrous materials may be substantially united by adhering the fibrous materials onto the elastic sheet utilizing processes such as, for example, electrostatic flocking to produce a composite elastic material having an increased pile density as described above.

As used herein, the term "lanate composite elastic material" refers to an elastic material having at least one elastic sheet and fibrous materials such as fibers (e.g., synthetic fibers, natural fibers, or monofilament strands) or fiber bundles (e.g., yarns, threads, or multifilament strands) inserted into the elastic sheet by mechanical needling techniques to provide a woolly or fleece-like material having stretch and recovery properties. Lanate composite elastic materials also are drapable, bulky (e.g., low density) and have good insulation properties.

As used herein, the term "superabsorbent" refers to absorbent materials capable of absorbing at least 10 grams of aqueous liquid (e.g. water) per gram of absorbent material while immersed in the liquid for 4 hours and holding the substantially all absorbed liquid while under a compression force of up to about 1.5 psi.

As used herein, the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

As used herein, the term "consisting essentially of" does not exclude the presence of additional materials which do not significantly affect the desired characteristics of a given composition or product. Exemplary materials of this sort would include, without limitation, pigments, antioxidants, solvents, stabilizers, surfactants, waxes, flow promoters, particulates and materials added to enhance processability of the composition.

SUMMARY OF THE INVENTION

The present invention addresses the problems discussed above by providing both lanate composite elastic materials and increased pile density composite elastic materials as well as methods of making the same.

According to the present invention, the method of making a lanate composite elastic material includes the steps of applying a tensioning force to elongate at least one elastic sheet; inserting substantially individualized fibrous materials into the elastic sheet by mechanical needling the elastic sheet while it is maintained in an elongated condition; and releasing the tensioning force so the attached fibrous materials are positioned closer together by the recovery of the elastic sheet. The resulting lanate composite elastic material has stretch and recovery properties, bulk, and desirable insulation properties.

In one aspect of the present invention, an increased pile density composite elastic material is made by a method which includes the step of inserting substantially individualized fibrous materials into an elongated elastic sheet by stitchbonding, malipole stitchbonding, or tufting or, alternatively, the step of adhering substantially individualized fibrous materials to an elongated elastic sheet by flocking techniques. The density of attached fibrous materials in the resulting increased pile density composite elastic material is greater than could be achieved by conventional fiber insertion or adherence techniques while still maintaining desirable elastic properties, bulk, drape and conformability.

The present invention also contemplates multilayer materials composed of at least one layer of a lanate composite elastic material and/or increased pile density composite elastic material and at least one other layer of material.

Generally speaking the elastic sheet, such as, for example, an elastic nonwoven web, should be elongated at least about 15 percent, for example, from about 20 to about 400 percent and maintained in that elongated condition while the individualized fibrous materials, such as, for example, a carded batt of staple fibers are attached to the elastic sheet. Additional attachment between the inserted fibrous materials and the elastic sheet may be achieved by using a pressure sensitive adhesive elastic sheet or by using a thermal binder. The thermal binder may be in the form of bi-component or multi-component fibers having a low-melting sheath and a high-melting core, or a blend of low-and high-melting fibers. The thermal binder may be used in the elastic sheet or in both the fibrous materials and the elastic sheet.

The elastic sheet may be an elastic film or an elastic nonwoven web of fibers such as, for example, an elastic bonded carded web, an elastic spunbonded web, or an elastic web of meltblown fibers. If the elastic nonwoven web contains meltblown fibers, the meltblown fibers may include meltblown microfibers. The elastic nonwoven web may have multiple layers such as, for example, multiple spunbond layers and/or multiple meltblown layers.

The elastic sheet may be made of an elastic polymer selected from, for example, elastic polyesters, elastic polyurethanes, elastic polyamides, elastic copolymers of ethylene and at least one vinyl monomer, and elastic A-B-A' block copolymers wherein A and A' are the same or different thermoplastic polymer, and wherein B is an elastomeric polymer block. A polyolefin may also be blended with the elastomeric polymer to improve the processability of the composition when the elastic sheet is made using nonwoven extrusion processes. Polyolefins which may be blended with the elastomeric polymer include, for example, polyethylene, polypropylene and polybutylene, including ethylene copolymers, propylene copolymers and butylene copolymers. Other substances may be used in addition to or in place of a polyolefin (e.g., a low molecular weight hydrocarbon resin and/or a mineral oil).

The individualized fibrous materials may be nonelastic fibers or nonelastic fiber bundles. The fibers may be in the form of an un-bonded web or batt of individualized fibers, such as, for example, a carded batt of staple fibers or a web of loose meltblown fibers. Useful staple fibers have a denier, for example, from about 0.5 to about 20 and an average length, for example, from about ½ inch to about 6 inches. If the fibrous materials are fiber bundles, they may be, for example, threads, yarns, or multifilament strands.

The fibrous materials may be natural fibers, such as, for example, plant, animal or mineral fibers. For example, the fibrous materials may be cotton, wool, or glass fibers. The fibrous materials may also be man-made fibers, such as, for example, reconstituted cellulose or synthetic polymer fibers including, for example, fibers formed from nylon, polyester, polypropylene, polyethylene, polybutylene, polyethylene copolymers, polypropylene copolymers, and polybutylene copolymers.

In one aspect of the present invention, at least one layer of the lanate composite elastic material and/or the increased pile density composite elastic material may be combined with at least one other layer of material to form a multilayer material.

DETAILED DESCRIPTION OF THE INVENTION

Figure 1:
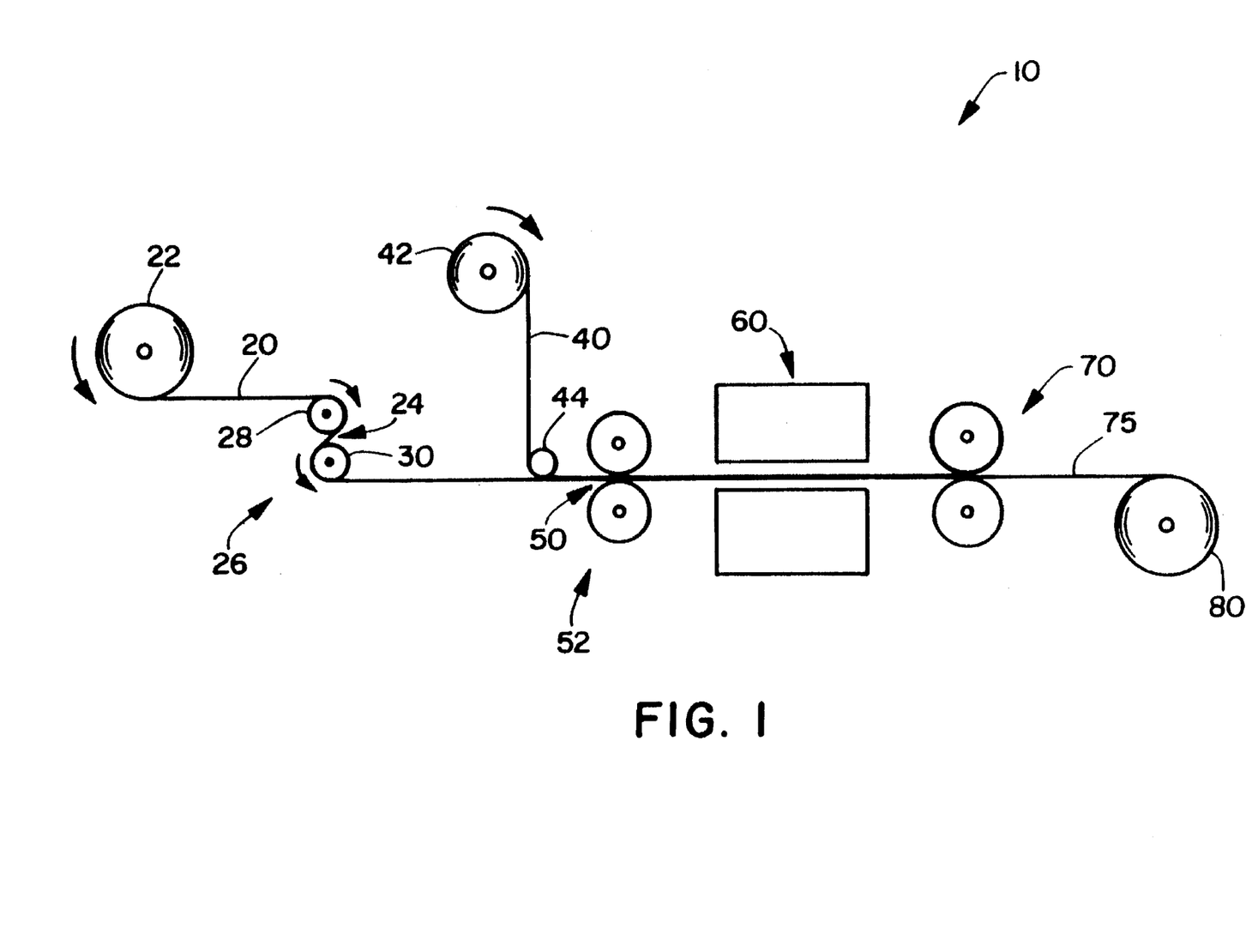
FIG. 1 is a schematic representation of an exemplary process for making the materials of the present invention.

Referring to the drawings where like reference numerals represent like materials or process steps and, in part, to FIG. 1, there is schematically illustrated at 10 a process for forming the materials of the present invention.

An elastic sheet 20 is unwound from a supply roll 22 and travels in the direction indicated by the arrow associated therewith as the supply roll 22 rotates in the direction of the arrows associated therewith. The elastic sheet 20 passes through a nip 24 of a S-roll arrangement 26 formed by the stack rollers 28 and 30.

The elastic sheet 20 may be formed by known nonwoven extrusion processes, such as, for example, known meltblowing processes or known spunbonding processes, and passed directly through the nip 24 without first being stored on a supply roll.

A layer of generally individualized fibrous materials 40 is unwound from a supply roll 42 and travels in the direction indicated by the arrow associated therewith as the supply roll 42 rotates in the direction of the arrows associated therewith. The layer of fibrous materials 40 passes idler roller 44 as it is overlaid onto the elastic sheet 20. Generally speaking, the fibrous materials 40 may be formed by extrusion processes such as, for example, meltblowing processes or other processes such as, for example, carding processes and overlaid onto the elastic sheet 20 without first being stored on a supply roll. Desirably, the fibrous materials 40 may be in the form of an individualized fiber web or batt such as an un-bonded web of fibers (e.g., a carded web of fibers or a layer of loose fibers deposited directly upon a carrier sheet) which is transported to elastic sheet 20.

The elastic sheet 20 passes through the nip 24 of the S-roll arrangement 26 in a reverse-S path as indicated by the rotation direction arrows associated with the stack rollers 28 and 30. From the first S-roll arrangement 26, the elastic sheet 20 is overlaid with the layer of fibrous materials 40 as both the elastic sheet 20 and the layer of fibrous materials 40 pass through a nip 50 of a first drive roller arrangement 52. Because the peripheral linear speed of the rollers of the S-roll arrangement 26 is controlled to be less than the peripheral linear speed of the rollers of the first drive roller arrangement 52, the elastic sheet 20 is tensioned between the S-roll arrangement 26 and the nip of the drive roller arrangement 52. By adjusting the difference in the speeds of the rollers, the elastic sheet 20 is tensioned so that it stretches a desired amount. The layer of fibrous materials 40 may also pass through the nip 24 of the S-roll arrangement 26 and be stretched along with the elastic sheet between the S-roll arrangement 26 and the first drive roller arrangement 52.

The elastic sheet 20 is maintained in a uniformly stretched condition as the fibrous materials 40 are attached to the stretched elastic sheet 20 during their passage through the fiber attachment apparatus 60 because the peripheral linear speed of the rollers of a second drive roller arrangement 70 is controlled to be approximately the same as the peripheral linear speed of the rollers of the first drive roller arrangement 52. After passing drive rollers 70, the tension which elongates the elastic sheet 20 with the attached fibrous materials 40 is released so that the attached fibrous materials 40 are positioned more closely together by the recovery of the elastic sheet 20 to form a resulting composite elastic material 75 that is stored on a wind-up roll 80.

Other methods of stretching the elastic sheet 20 while the fibrous materials 40 are attached to the elastic sheet 20 may be used such as, for example, tenter frames or other cross-machine direction stretcher arrangements that expand the elastic sheet in one or several other directions such as, for example, in both the machine and the cross-machine direction.

Generally, any suitable elastomeric sheet forming resins or blends containing the same may be utilized for the elastic nonwoven web of fibers. For example, the elastic sheet 20 may be made from block copolymers having the general formula A-B-A' where A and A' are each a thermoplastic polymer endblock which contains a styrenic moiety such as a poly (vinyl arene) and where B is an elastomeric polymer midblock such as a conjugated diene or a lower alkene polymer.

The elastic sheet 20 may be formed from, for example, (polystyrene/ poly(ethylene-butylene)/polystyrene) block copolymers available from the Shell Chemical Company under the trademark KRATON G. One such block copolymer may be, for example, Kraton™ G-1657.

Other exemplary elastomeric materials which may be used to form the elastic sheet 20 include polyurethane elastomeric materials such as, for example, those available under the trademark ESTANE® from B.F. Goodrich & Co., polyamide elastomeric materials such as, for example, those available under the trademark PEBAX® from the Rilsan Company, and polyester elastomeric materials such as, for example, those available under the trade designation HYTREL® from E.I. DuPont De Nemours & Company. Formation of elastic sheets from polyester elastic materials is disclosed in, for example, U.S. Pat. No. 4,741,949 to Morman et al., hereby incorporated by reference. The elastic sheet may also be formed from elastic copolymers of ethylene and at least one vinyl monomer such as, for example, vinyl ester monomers, unsaturated aliphatic monocarboxylic acids and alkyl esters of such unsaturated monocarboxylic acids. These elastic copolymers and methods of forming elastic sheets from such materials are disclosed in, for example, U.S. Pat. No. 4,803,117, hereby incorporated by reference.

A polyolefin may also be blended with the elastomeric polymer to improve the processability of the composition when using nonwoven extrusion processes. The polyolefin must be one which, when so blended and subjected to an appropriate combination of elevated pressure and elevated temperature conditions, is extrudable, in blended form, with the elastomeric polymer. Useful blending polyolefin materials include, for example, polyethylene, polypropylene and polybutylene, including polyethylene copolymers, polypropylene copolymers and polybutylene copolymers. A particularly useful polyethylene may be obtained from the U.S.I. Chemical Company under the trade designation Petrothane NA 601 (also referred to herein as PE NA 601 or polyethylene NA 601). Two or more of the polyolefins may be utilized. Extrudable blends of elastomeric polymers and polyolefins are disclosed in, for example, U.S. Pat. No. 4,663,220 to Wisneski et al., hereby incorporated by reference.

The elastic sheet 20 may also be a pressure sensitive elastomer adhesive sheet. For example, the elastic material itself may be tacky or, alternatively, a compatible tackifying resin may be added to the extrudable elastomeric compositions described above to provide an elastic sheet 20 that can act as a pressure sensitive adhesive, e.g., to help bond the elastic sheet 20 with the fibrous materials 40. In regard to the tackifying resins and tackified extrudable elastomeric compositions, note the resins and compositions as described in U.S. Pat. No. 4,789,699 to Kieffer et al., the disclosure of which is hereby incorporated by reference.

Any tackifier resin can be used which is compatible with the elastomeric polymer and can withstand the high processing (e.g., extrusion) temperatures. If blending materials such as, for example, polyolefins or extending oils are used, the tackifier resin should also be compatible with those blending materials. Generally, hydrogenated hydrocarbon resins are preferred tackifying resins, because of their better temperature stability. REGALREZ™ and ARKON™ P series tackifiers are examples of hydrogenated hydrocarbon resins. ZONATAK™501 lite is an example of a terpene hydrocarbon. REGALREZ™ hydrocarbon resins are available from Hercules Incorporated. ARKON™ P series resins are available from Arakawa Chemical (U.S.A.) Incorporated. Of course, the present invention is not limited to use of such three tackifying resins, and other tackifying resins which are compatible with the other components of the composition and can withstand the high processing temperatures, can also be used.

Thus, a pressure sensitive elastomer adhesive sheet which is useful for the composite elastic materials of the present invention may be formed from a blend containing, for example, about 40 to about 80 percent, by weight, A-B-A' block copolymer; about 5 to about 40 percent, by weight, polyolefin; and about 5 to about 30 percent, by weight, tackifying resin.

Tackiness may also be imparted to the elastic sheet 20 by using a solvent that causes the elastic to become tacky without substantially weakening the elastic. The solvent is then substantially evaporated from the elastic sheet after the elastic sheet 20 and the fibrous materials 40 have been joined.

The elastic sheet 20 may also be a multilayer material in that it may include two or more individual coherent webs before being combined with the fibrous materials 40. Additionally, the elastic sheet 20 may be a multilayer material in which one or more of the layers contain a mixture of elastic and nonelastic fibers or particulates. An example of the latter type of elastic sheet, reference is made to U.S. Pat. No. 4,209,563, incorporated herein by reference, in which elastomeric and non-elastomeric fibers are commingled to form a single coherent web of randomly dispersed fibers. Another example of such a composite web would be one made by a technique such as disclosed in previously referenced U.S. Pat. No. 4,741,949. That patent discloses nonwoven materials which include a mixture of meltblown thermoplastic fibers and other materials. The fibers and other materials (e.g., wood pulp, staple fibers or particulates such as, for example, hydrocolloid (hydrogel) particulates commonly referred to as superabsorbents) are combined in the gas stream in which the meltblown fibers are carried so that an intimate entangled commingling of the meltblown fibers and the other materials occurs prior to collection of the fibers upon a collecting device to form a coherent web of randomly dispersed fibers.

The fibrous materials 40 may be fibers or fiber bundles. If the fibrous materials are fibers, they may be in the form of a nonwoven web of individualized fibers such as, for example, a nonwoven web in which the fibers are substantially un-bonded so that they are loose and may be easily adhered to and/or inserted into the elastic sheet 20. Such an un-bonded web or batt of fibers may be, for example, a carded batt of staple fibers or a web of loose meltblown fibers.

If the nonwoven web contains meltblown fibers, the meltblown fibers may also include microfibers. The meltblown fibers may be made of fiber forming polymers such as, for example, polyolefins. Exemplary polyolefins for use in the nonwoven web include one or more of polypropylene, polyethylene, polybutylene, ethylene copolymers, propylene copolymers, and butylene copolymers. Useful polypropylenes include, for example, polypropylene available from the Himont Corporation under the trade designation PC-973, polypropylene available from the Exxon Chemical Company under the trade designation Exxon 3445, and polypropylene available from the Shell Chemical Company under the trade designation DX 5A09.

The fibrous materials 40 may also be a mixture of two or more different fibers or a mixture of fibers and particulates. Such mixtures may be formed by adding fibers and/or particulates (e.g., wood pulp, staple fibers and particulates such as, for example, hydrocolloid (hydrogel) particulates commonly referred to as superabsorbent materials) to the gas stream which carries the meltblown fibers. As a result, the meltblown fibers and the other materials may be intimately entangled and mixed prior to collection of the meltblown fibers upon a collecting device to form a coherent web of randomly dispersed meltblown fibers and other materials such as disclosed in previously referenced U.S. Pat. No. 4,741,949.

The fibrous materials 40 may also be in the form of a loose batt or web of individualized staple fibers, wood pulp fibers or mixtures of the above. Typical mixtures of wood pulp fibers and staple fibers contain from about 20 to about 90 percent by weight staple fibers and from about 10 to about 80 percent by weight wood pulp fibers.

The staple fibers may have a denier in the range of about 0.5 to about 100 and an average length in the range of about 0.5 inch to about 6 inches. The fibrous materials 40 may be natural fibers such as plant, animal or mineral fibers, such as, for example, cotton, wool or asbestos. The staple fibers may be either crimped or uncrimped fibers. Pulp fibers including long natural fiber pulps such as, for example, hardwood pulps may also be used. The fibrous materials 40 may also be man-made fibers such as reconstituted cellulose fibers or synthetic polymer fibers. For example, the fibers may be one or more of rayon, polyester, polyamides, and acrylics. Polyolefins may also be used, including, for example, one or more of polyethylene, polypropylene, polybutylene, polyethylene copolymers, polypropylene copolymers and polybutylene copolymers. Bi-component or multi-component fibers may also be used including, for example, side-by-side and sheath-core bicomponent fibers. Microdenier fibers may be used in situations such as, for example, when flocking processes are utilized. Fibers used in flocking processes may have an average length as low as 0.075 inch.

As noted previously, the individualized fibrous materials 40 may be fiber bundles such as, for example, yarns, threads, twines or multifilament materials. Fiber bundles may be used with equipment such as, for example, tufting machines or stitchbonding machines which individually insert the fiber bundles into the stretched elastic sheet 20 by tufting processes or stitchbonding processes rather than by being deposited directly upon the stretched elastic sheet 20 and then inserted by a needling operation or adhered by a flocking operation.

The type of individualized fibrous materials 40 which are attached to the elastic sheet 20 as well as the density at which they are attached will affect the basis weight of the resulting composite elastic material 75. The composite elastic material 75 may have a basis weight ranging from about 10 gsm to 150 gsm or more.

The density at which the fibrous materials 40 are attached to the elastic sheet will vary depending on, for example, the type of fibrous materials used, the elongation at which the elastic sheet is maintained while the fibrous materials are being attached to the elastic sheet, and the amount that the elastic sheet recovers upon release of the stretching force.

If the fibrous materials 40 are individualized fibers, they may be attached to the elastic sheet 20 by mechanical needling. Mechanical needling may be carried out on needlepunching machines such as, for example, down-punch board machine Model No. DS-2E, up-punch board machine Model No. SM-4E and double-punch needling machine DF-4E, available from Asselin America, Inc., Charlotte, N.C. Needle boards having a needle density from about 30 needles per inch to greater than 240 needles per inch may be used for most applications.

The fibers of the fibrous materials 40 may also be attached to the elastic sheet 20 while the elastic sheet 20 is in the stretched condition utilizing flocking processes such as, for example, electrostatic flocking or vibration flocking. In flocking processes, an adhesive is applied to a substrate and fibers are implanted into the adhesive using electrostatic forces, compressed air or by applying fibers onto the adhesive and then vibrating the substrate with a beater bar to drive the fibers into the adhesive. An adhesive which remains elastic after it sets should be used if a flexible and elastic flocked composite material is desired. Suitable adhesives include, for example, latex-based flock adhesives such as, for example, adhesives available from the B.F. Goodrich Company under the trade designation Geon® and Hycar®; adhesives available from the Rohm & Haas Company under the trade designation Rhoplex®; and adhesives available from Permuthane, Incorporated under the trade designation Permuthane®. The adhesives may be applied to the elastic sheet 20 by knife-coating, screen-printing or spraying and will set to form a flexible, elastic, and tack free coating which will adhere to many substrates and fibers.

If the fibrous materials 40 are fiber bundles, the fiber bundles may be attached to the elastic sheet 20, utilizing conventional tufting equipment such as tufting machines available from the Card-Monroe Corporation, Hixon, Tenn., and the Cobble Tufting Machine Company, Dalton, Ga. The needle gauge of the tufting machines may vary from about 5/32 inch to about 1/20 inch with the pile height varying from about 5 mm to about 3 mm. The tuft density may range from about 39 tufts per 10 square centimeters to about 106 tufts per 10 square centimeters as measured while the elastic sheet is maintained in an elongated condition.

The elastic sheet 20 should be held under substantially uniform tension while being mechanically needled or tufted to avoid damage to the punch needles or tuft needles. If the elastic sheet 20 is not held securely so that the tension is uniform while it is mechanically needled or tufted, the punch needles or tuft needles may bend and break if they are deflected by non-uniform movements of the elastic sheet 20. The elastic sheet 20 may be held using methods such as, for example, a set of nip rolls rotating at the same speed positioned before and after the mechanical needling apparatus. It is also advantageous to hold the elongated elastic sheet under uniform tension during other fibrous material attachment processes such as, for example, flocking processes to increase the uniformity of the resulting increased pile density composite elastic material.

Stretching the elastic sheet 20 while fibrous materials 40 are being attached onto the elastic sheet will provide desirable characteristics to the resulting composite material as well as advantages to the fiber attachment process. These characteristics include, for example, increased pile density, and/or enhanced fleeciness or lanate characteristics, improved retention of the fibrous materials in the elastic sheet, and improved elongation over equivalent elastic composite materials in which the fibers are attached while the elastic is unstretched. Additionally, the method of the present invention is especially well suited for mechanical needling because high densities of fiber insertion can be accomplished without multiple passes through the needling apparatus. Such multiple passes typically cause matting of the fibers and may destroy the lanate or fleece-like characteristics of the composite material. Materials having lanate or fleece-like characteristics are desirable not only for their insulation properties but also for soft hand and fabric texture.

Materials of the present invention having lanate characteristics typically have low densities. For example, the materials may have a density ranging from about 0.2 to about 0.04 grams per cubic centimeter. The lanate composite elastic materials also have desirable insulation properties. Lanate composite elastic materials of the present invention may have a normalized dry heat transfer rate of at least about 15 Clo/gram/cubic centimeter. For example, the lanate composite elastic materials may have a normalized dry heat transfer rate from about 16 to about 30 Clo/gram/cubic centimeter. More particularly, the lanate composite elastic materials may have a normalized dry heat transfer rate from about 18 to about 21 Clo/gram/cubic centimeter.

Lanate composite elastic materials of the present invention may have a wet heat transfer rate of less than about 3.1 Watts/$M^2 \cdot °C$. For example, the lanate composite elastic materials may have a wet heat transfer rate from about 3.0 to about 2.7 Watts/$M^2 \cdot °C$. More particularly, the lanate composite elastic materials may have a wet heat transfer rate from about 2.9 to about 2.8 Watts/$M^2 \cdot °C$.

The lanate composite elastic materials of the present invention may have desirable moisture vapor transmission rates, that is, moisture vapor easily penetrates the materials to improve the comfort of a person wearing a garment which contains the composite material. For example, the lanate composite material may have a permeability index of at least about 0.5. For example, the lanate composite elastic materials may have a permeability index greater than about 0.55. More particularly, the lanate composite elastic materials may have a permeability index greater than about 0.57.

One important feature of the materials of the present invention is that they may be designed to combine softness, drapeability, conformability, insulation and permeability with highly desirable elasticity. Insulation having elastic properties is expected to be very useful in applications such as apparel and blankets. Generally speaking, the stretch and recovery properties of the present materials is believed to provide insulation having longer life and enhanced performance when subjected to stretching and compression and similar forces commonly encountered in apparel and bedding applications.

Although the inventors should not be held to a particular theory of operation, the mechanical needling of individualized nonelastic fibrous materials into an elastic sheet while the elastic sheet is maintained in a stretched condition improves the elasticity of the resulting composite material because the process appears to minimize fiber-to-fiber entanglement between the nonelastic fibrous materials which restricts the ability of the elastic sheet to stretch.

The effective needling density or needling rate of a fiber inserting apparatus such as, for example, a mechanical needling machine, tufting machine or a stitchbonding machine may be increased without increasing the number of needlestrokes per minute or the density of the needles. This may be accomplished by elongating an elastic sheet and then passing the elongated elastic sheet through the fiber inserting apparatus. For example, a needle punch machine having a needle-stroke rate of 2000 strokes/minute and operating at a speed of 20 meters/minute will punch the elastic sheet approximately 100 times/meter with each needle. If the elastic sheet is elongated to a length which is 200% of its relaxed length (i.e., 100 percent elongation) and the elongated elastic sheet is processed at the same needlestroke rate of 2000 strokes/minute and the same speed of 20 meters/minute then, upon relaxation of the elastic sheet, the needlepunch machine will have punched the elastic sheet the equivalent of 200 times/meter with each needle.

When used with mechanical needling equipment, the method of the present invention may be used to produce composite elastic materials having a much more lanate or fleece-like appearance than conventional mechanically needled composite materials (i.e., where the substrate remains unstretched during needling), especially when the materials are subjected to multiple passes of mechanical needling. Furthermore, conventional hydraulic entangling processes, especially multiple-pass processes may produce composites of fibrous materials and elastic substrates having good fiber retention but which are so intertwined that the entangled fibrous materials are unable to protrude from the substrate to form a lanate or fleece-like material. Such hydraulically entangled materials may also have high densities and relatively low drape or conformability. Utilizing the method of the present invention, composite elastic materials may be made in which the attached fibrous materials protrude at least about 1 millimeter from the surface of the elastic sheet to form a dense pile or lanate, fleece-like surface with desirable fiber retention. Composite elastic materials may be produced having fibrous materials which protrude from about 1 millimeter to more than 3 millimeters from the surface of the elastic sheet.

For example, an elastic sheet may be elongated approximately 100% (i.e. approximately 200% of its relaxed length) and fibrous materials may be mechanically needled into the elongated elastic sheet, then if the elastic sheet is allowed to recover to about its original unstretched dimension (e.g., within about 20% to 25% of its original unstretched dimension because of the added bulk of the inserted fibrous materials), the mechanical needling sites spaced 1" apart in the elongated elastic sheet will contract to a spacing of 0.6" to 0.625" apart in the relaxed fabric. This decrease in the separation between mechanical needling sites upon recovery of the elastic sheet will cause fibers that are attached to the elastic sheet at multiple punch sites to extend further out from the elastic sheet because the length of the fibrous material between the punch sites, also commonly known as the runner length, remains constant. That is, a fiber extending above the elastic substrate, for example, about 0.25" and anchored at, for example, two punch sites about 1" apart when the elastic is stretched will typically, upon relaxation of the elastic sheet so the punch sites are spaced about 0.6"

apart, extend about another 0.2" from the elastic substrate which is about the same distance as the recovery of the elastic material.

Composite elastic materials according to the present invention may be made utilizing low basis weight elastic nonwoven webs because the method of the present invention allows individualized fibrous materials to be incorporated into low basis weight elastic nonwoven webs without substantially deteriorating the elastic nonwoven webs and because the retraction of the elastic nonwoven webs helps to hold or lock the pile fibers into the low basis weight elastic sheet.

EXAMPLES

An unstretched elastic sheet of meltblown ARNITEL® polyetherester fibers made in accordance with the teachings of U.S. Pat. No. 4,707,398 and having a basis weight of 1 ounce per square yard (osy) was joined to a batt of 3 denier polyethylene terephthalate (PET) fibers having a basis weight of approximately 1.5 osy. ARNITEL® is the trade designation for a melt processable polyetherester that is from available A. Schulman, Inc. of Akron, Ohio or DSM Engineering Plastics, North America, Inc., of Reading, Pa. The elastic sheet and the batt of PET fibers were joined by mechanical needling at a rate of about 500 strokes/minute traveling at a speed of 5.4 meters/minute (92.6 strokes/meter) on an Asselin Model SD 351M04 Needlepunch machine utilizing a down punch needle board with 6 rows of 36 RBA needles at a density of about 139 needles/inch. The needlepunch machine was set so that the needle penetration was 18.4 mm. The physical characteristics and Grab Tensile Test results for this composite material were determined utilizing the equipment and procedures detailed below and are reported in Table 1 under the heading "Unstretched".

A section of the same elastic sheet of meltblown polyetherester fibers having a basis weight of 1 osy was elongated approximately 263 percent in the machine direction and was joined while in the elongated condition to an un-bonded 1.5 osy batt of 3 denier polyethylene terephthalate (PET) fibers which was also elongated approximately 263 percent in the machine direction. The elastic sheet and the batt of fibers were joined utilizing the Asselin needle punching machine with the same needle board and at the same conditions as the unstretched material except that the mechanical needling of the elongated materials was carried out at a rate of about 850 strokes/minute and at a speed of 9.2 meters/minute (92.4 strokes/meter). The physical characteristics and Grab Tensile Test results for this composite material were determined utilizing the equipment and procedures detailed below and are reported in Table 1 under the heading "Stretched".

The lanate composite elastic material produced using the method of the present invention had a basis weight of 4.9 osy. The composite elastic material produced by mechanically needling the unstretched elastic sheet had a basis weight of 5.5 osy. The inventors attribute the lower basis weight of the increased pile density material to the incomplete recovery of the elastic base sheet because of the inserted fibrous materials and the void volume between the fibrous materials held within the elastic base sheet.

Grab Tensile Tests were conducted essentially in accordance with Method 5100 of Federal Test Method Standard No. 191A, utilizing samples of the entangled material having a width of about 4 inches and a length of about 6 inches. The samples were held at opposite ends by a one (1) square inch gripping surface. The samples were tested using an Intellect II tensile testing apparatus available from Thwing Albert having a (3) inch jaw span and a crosshead speed of about (12) inches per minute. Values for peak load, peak energy absorbed, peak percentage elongation, total energy absorbed and total percentage elongation were determined.

Drape stiffness measurements were performed using a stiffness tester available from Testing Machines, Amityville, Long Island, N.Y. 11701. Test results were obtained in accordance with ASTM standard test D1388-64 using the method described under Option A (Cantilever Test).

The air permeability of each sample was determined in accordance with Method 5450 of Federal Test Method Standard No. 191A.

The following Table 1 includes the basis weight, bulk, density, tensile test data, drape and air permeability results for the lanate composite elastic material of the present invention and the previously described unstretched mechanically needled composite elastic material. Tensile test data indicates significant differences in load, elongation and energy at greater than the 90% confidence level. The tensile load and energy values for the materials are also expressed as the tensile load and energy per unit weight of the material. This was accomplished by dividing the test results for each material by the material's basis weight.

TABLE 1

| Type of Material: | Unstretched | | Stretched | |
|---|---|---|---|---|
| | Mean | s | Mean | s |
| Basis weight | 5.53 osy | 0.27 | 4.90 osy | 0.29 |
| Bulk | 0.034 in. | 0.005 | 0.033 in. | 0.006 |
| Density | 0.13 oz/in$^3$ | | 0.11 oz/in$^3$ | |
| Machine Direction Grab Tensile Test Results | | | | |
| Tensile Load$^1$ | 9.3 | 1.1 | 10.2 | 2.5 |
| Tensile Load$^2$ | 1.7 | | 2.4 | |
| Percent Elong. | 148.8 | 10.9 | 177.1 | 37.2 |
| Energy$^3$ | 19.0 | 2.9 | 26.8 | 9.7 |
| Energy$^4$ | 3.4 | | 5.5 | |
| Cross-Machine Direction Grab Tensile Test Results | | | | |
| Tensile Load$^1$ | 9.1 | 3.4 | 14.0 | 6.4 |
| Tensile Load$^2$ | 1.6 | | 2.9 | |
| Percent Elong. | 56.8 | 7.9 | 82.3 | 15.4 |
| Energy$^3$ | 5.9 | 2.6 | 11.5 | 7.4 |
| Energy$^4$ | 1.1 | | 2.1 | |
| Drape$^5$ | | | | |
| Machine Direction | 2.71 | 0.258 | 2.66 | 0.774 |
| Cross-Machine Direction | 3.98 | 0.940 | 3.70 | 0.570 |
| Air Permeability$^6$ | 111.5 | 5.59 | 112.8 | 12.1 |

$^1$ = lbs$_f$
$^2$ = lbs$_f$/ounce
$^3$ = (lbs$_f$ * inch)/inch$^2$
$^4$ = (lbs$_f$ * inch)/(inch$^2$ * ounce)
$^5$ = inches
$^6$ = cubic feet per minute An elastic sheet of meltblown ARNITEL® polyetherester fibers as described above (e.g., basis weight of about 1 osy) was stretched approximately 15 percent and maintained in its stretched condition while it was joined to two batts of crimped polyester staple fibers (i.e., one batt on each side of the elastic sheet). The polyester staple fiber batts contained a mixture of about 50 percent, by weight, 6 denier crimped fibers and about 50 percent, by weight, 15 denier crimped fibers. The staple fibers had an average length of about 3 inches. Each batt of polyester fibers had a basis weight of about 3.5 osy.

The layers were joined utilizing two needling machines arranged in series. First, the fiber batts were tacked to the elastic layer utilizing a conventional tack needling machine. The tack needled fiber batts then were passed through a conventional top and bottom needling machine (available from Oskar Dilo of Eberbach, Germany) which needled both sides of the composite. The top and bottom needling machine was equipped with 25 gauge Groz-Beket needles mounted on a low-density needle board having a needle density of about 80 needles per inch. The needling was carried out under standard conditions for the particular fiber batt and low-density needle board. Upon recovery of the elastic sheet, the basis weight of the needled composite was about 8 osy.

Physical properties of the needled composite material were measured. The elongation of the composite was measured by the Grab Tensile Test method described above. Bulk or thickness of the sample was measured at an applied pressure of about 25 grams$_{force}$ per square centimeter.

The needled composite material was sandwiched between two pieces of a conventional nylon textile, each piece having a basis weight of about 6.5 osy. This was done to simulate apparel construction in which an insulating layer is located between an outer and inner fabric shell.

Thermal resistance and permeability of this apparel construction were determined in order to evaluate the effectiveness of the needlepunched composite as an insulation material. The thermal analyzing system was composed of two parts: (1) an environmental control chamber which was maintained at a standard condition: 21 degrees Centigrade, 65% Relative Humidity; and (2) a component to stimulate the skin/body.

The environmental control chamber was a Tabai ESPEC's Platinous Lucifer Model PL-2G, programmable temperature and humidity chamber. This chamber housed a sub-chamber made from Lucite plastic that provided precise control of air velocity. A skin simulating guarded hot plate, or sweating hot plate, was positioned inside the sub-chamber. Air currents impinged vertically on the surface of the guarded hot plate at a rate of about 20 cm/sec.

Simultaneous heat and moisture transfer was measured using a sweating hot plate. This sweating hot plate featured four simulated sweating glands that supplied water to the heated surface at the rate of 0.077 ml/min per gland. The water flow was controlled using an Ismatec cartridge peristaltic pump while the surface of the hot plate was covered by a highly wettable and dimensionally stable polyester/rayon-spunlace nonwoven membrane to allow water to easily spread over the surface. Two simulated skin-clothing models were used: (1) a standard dry model, and (2) a standard wet model. A guarded hot plate was used as a heat source for the standard dry model. A sweating hot plate was used as the heat source for the for the standard wet model. In both models, specimens were placed directly on the heat source.

The amount of heat and rate of heat flow through a specimen during testing was measured utilizing a box containing a thin copper heat capacitor fitted with a temperature sensing device. These components were placed between the heat source (i.e., the hot plate) and the specimen to detect the rate at which heat was pulled from a finite thermal capacity (e.g., simulated skin) through a fabric.

The Dry Heat Transfer rate was measured and reported in units of Watts/M$^2$·°C. Thermal resistance was calculated from the measured Dry Heat Transfer rate utilizing the following equation:

Thermal Resistance=(1/Dry Heat Transfer Rate)/0.155

Thermal resistance is reported in units of clo. The clo is a unit of thermal resistance defined as the amount of thermal resistance provided by an arbitrarily selected standard set of clothing. It may be expressed by the following equation:

$$1 clo = ((0.18° C.) (meter)^2 (hour))/(kilocalories)$$

The highest clo value represents the lowest heat flow through the material and is predicted to be the better insulator. For the purpose of comparison, values for thermal resistance was calculated from the reported Wet Heat Transfer rate.

The Permeability Index ($I_m$) of the sample was calculated from the measured Dry Heat Transfer rate and Wet Heat Transfer rate. The permeability index is defined as the ratio of the thermal and evaporative resistance of the fabric to the ratio of thermal and evaporative resistance of air. This ratio (i.e., the permeability index), which may have a value that is between 0 and 1, serves as a measure of how readily moisture vapor and heat pass from the body through a material to help maintain body comfort. A higher index value (>1) is generally equated with better comfort. The permeability index may be calculated using the following formula:

$$I_m = 0.0607(E/H)(Ts-Ta)/(Ps-Pa)$$

where, $E$=heat transfer rate (W/m$^2$·°C.▲T) due to moisture evaporation, (Wet Heat Transfer–Dry Heat Transfer)

$H$=heat transfer rate (W/M$^2$·°C.▲T) due to heat, (Dry Heat Transfer)

$Ps(T)$=exp (16.6536–4030.183/(T+235))

$Pa(T)$=(RH/100)Ps (T) Ts and Ta are the temperature on the skin surface and the ambient environment, respectively, and RH is the relative humidity.

Ts=35° C., Ta=21° C. Rh=65%

Ps and Pa are water vapor pressures (kPa) on skin surface and in ambient environment, respectively.

Dry Heat Transfer rates and Wet Heat Transfer rates were also measured for a batt of standard goose down used as thermal insulation in apparel (80%, by weight, goose down, 20%, by weight, goose feathers); a sample of Thinsulate® thermal insulation material available from Minnesota Mining and Manufacturing Company (3M) of Saint Paul, Minn.; and Thermoloft protective insulation of Dacron® polyester fibers available from E.I. Du Pont de Nemours & Company. The results of these tests are reported in Table 2.

As can be seen from Table 2 the samples were not uniform in weight or bulk. Accordingly, the data was normalized to provide a meaningful comparison. The test results indicate that composite materials of the present invention provide a level of desirable insulation properties which is generally similar to such well known insulation materials as goose down, Thinsulate®, and a batt of Dacron® polyester fibers while also providing desirable stretch and recovery properties which are especially desirable for applications such as, for example, apparel, blankets, sleeping bags and the like.

TABLE 2

| PHYSICAL PROPERTIES | Bulk[1] | Basis Weight[2] | Density[3] | Stretch & Recovery[4] |
|---|---|---|---|---|
| Goose Down | 20.146 | 18.69 | 0.031 | — |
| Thinsulates ® | 7.117 | 14.18 | 0.067 | — |
| Needle Punched Demique ® | 9.183 | 15.69 | 0.057 | 221 |
| Dacron ® Polyester | 7.983 | 11.27 | 0.047 | — |

[1] = millimeters
[2] = ounces per square yard
[3] = grams per cubic centimeter
[4] = percent

| DRY HEAT TRANSFER | Clo | Clo/cm | Clo/g/cm$^3$ |
|---|---|---|---|
| Goose Down | 1.33 | 0.66 | 42.90 |
| Needle Punched Demique ® | 1.13 | 1.23 | 19.82 |
| Thinsulate ® | 1.08 | 1.52 | 16.22 |
| Dacron ® Polyester | 1.00 | 1.25 | 21.28 |

| WET HEAT TRANSFER | Watts/M$^2$·°C. | Clo |
|---|---|---|
| Dacron ® Polyester | 3.10 | 0.291 |
| Thinsulate ® | 3.07 | 0.294 |
| Needle Punched Demique ® | 2.98 | 0.303 |
| Goose Down | 2.73 | 0.331 |

| PERMEABILITY INDEX | |
|---|---|
| Down | 0.639 |
| Needle Punched Demique ® | 0.579 |
| Thinsulate ® | 0.563 |
| Dacron ® Polyester | 0.510 |

Thus, it is apparent that the present invention provides a composite elastic material that reduces problems associated with previous pile-type and lanate, fleece-like materials.

At least one layer of the lanate composite elastic material and/or the increased pile density composite elastic material may be combined with at least one other layer of material to form a multilayer material. For example, a layer of the lanate composite elastic material may be sandwiched between a layer of lining fabric and a layer of shell fabric to form a multi-layer material that may be cut, shaped, formed, sewn or otherwise used directly in the manufacture of apparel.

While the invention has been described in conjunction with specific embodiments, the disclosed embodiments are intended to illustrate and not to limit the invention. It is understood that those of skill in the art should be capable of making numerous modifications without departing from the true spirit and scope of the invention.

What is claimed is:

1. A lanate composite elastic material comprising:
   at least one pressure sensitive elastomer adhesive sheet; and
   nonelastic fibrous materials inserted into said pressure sensitive elastomer adhesive sheet by mechanical needling while the pressure sensitive elastomer adhesive sheet is subject to a stretching force so that, upon recovery of the pressure sensitive elastomer adhesive sheet, the fibrous materials are positioned closer together than before recovery of said sheet, thereby providing a lanate appearance.

2. The lanate composite elastic material of claim 1, wherein the pressure sensitive elastomer adhesive sheet is comprised of an elastic polymer selected from the group consisting of elastic polyesters, elastic polyurethanes, elastic polyamides, elastic copolymers of ethylene and at least one vinyl monomer, and elastic A-B-A' block copolymers wherein A and A' are the same or different thermoplastic polymer, and wherein B is an elastomeric polymer block.

3. The lanate composite elastic material of claim 1, wherein the pressure sensitive elastomer adhesive sheet is a pressure sensitive elastomer adhesive nonwoven web.

4. The lanate composite elastic material of claim 3, wherein the pressure sensitive elastomer adhesive nonwoven web is selected from the group consisting of a web of meltblown fibers, a spunbonded web, and a bonded-carded web.

5. The lanate composite elastic material of claim 4, wherein the pressure sensitive elastomer adhesive nonwoven web is a composite web comprising a mixture of meltblown fibers and one or more other materials selected from the group consisting of wood pulp, staple fibers, particulates and superabsorbent particles.

6. The lanate composite elastic material of claim 4, wherein the meltblown fibers include meltblown microfibers.

7. The lanate composite elastic material of claim 5, wherein the fibers are selected from the group consisting of natural fibers, man-made fibers and monofilament strands.

8. The lanate composite elastic material of claim 7, wherein natural fibers are selected from the group consisting of cotton fibers, pulp fibers, and wool.

9. The lanate composite elastic material of claim 7 wherein the man-made fibers are selected from reconstituted cellulose fibers and synthetic polymer fibers.

10. The lanate composite elastic material of claim 9 wherein the synthetic polymer fibers are comprised of a polymer selected from the group consisting of polyolefins, polyesters, and polyamides.

11. The lanate composite elastic material of claim 10, wherein the polyolefin is selected from the group consisting of one or more of polyethylene, polypropylene, polybutylene, ethylene copolymers, propylene copolymers, and butylene copolymers.

12. The lanate composite material of claim 1, wherein the fibrous materials protrude from the elastic sheet at least about 1 millimeter.

13. The lanate composite material of claim 1, wherein the composite has a density ranging from about 0.2 to about 0.04 grams per cubic centimeter.

14. The lanate composite material of claim 1, wherein the composite has a normalized dry heat transfer rate of at least about 15 Clo/gram/cubic centimeter.

15. The lanate composite material of claim 1, wherein the composite has a wet heat transfer rate of at least about 2.8 Watts/M$^2$·°C.

16. The lanate composite material of claim 1, wherein the composite has a permeability index of at least about 0.5.

17. The lanate composite material of claim 1, wherein the composite has a permeability index from about 0.5 to about 0.57.

18. A multilayer material comprising at least one layer of the lanate composite elastic material of claim 1 and at least one other layer of material.

19. An increased pile density composite elastic material comprising:
   at least one pressure sensitive elastomer adhesive sheet; and
   individualized nonelastic fibrous materials inserted into said elastic sheet by stitchbonding, malipole stitchbonding or tufting techniques while the pressure sensitive elastomer adhesive sheet is subject to a stretching force so that, upon recovery of the pressure sensitive elastomer adhesive sheet, the fibrous materials are positioned closer together than before recovery of said sheet.

20. The increased pile density composite elastic material of claim 19 wherein the pressure sensitive elastomer adhesive sheet is a pressure sensitive elastomer adhesive nonwoven web.

21. The increased pile density composite elastic material of claim 19 wherein the pressure sensitive elastomer adhesive nonwoven web is selected from the group consisting of a web of meltblown fibers, a spunbonded web, and a bonded-carded web.

22. The increased pile density composite elastic material of claim 20, wherein the pressure sensitive elastomer adhesive nonwoven web is a composite web comprising a mixture of meltblown fibers and one or more other materials selected from the group consisting of wood pulp, staple fibers, particulates and superabsorbent particles.

23. The increased pile density composite elastic material of claim 21, wherein the meltblown fibers include meltblown microfibers.

24. The increased pile density composite elastic material of claim 20, wherein the fiber bundles are selected from the group consisting of yarns and multifilament strands.

25. An increased pile density composite elastic material comprising:
   at least one pressure sensitive elastomer adhesive nonwoven web of meltblown fibers; and
   nonelastic fibrous materials selected from the group consisting of fibers and fiber bundles, said fibrous materials projecting from the pressure sensitive elastomer adhesive nonwoven web of elastic meltblown fibers to form a pile, and
wherein the increased pile density composite elastic material is capable of being stretched to a length that is at least 200 percent of its relaxed length.

26. An increased pile density composite elastic material comprising:
   at least one pressure sensitive elastomer adhesive nonwoven web of elastomer meltblown fibers;
   fibrous materials adhered onto at least one surface of the pressure sensitive elastomer adhesive nonwoven web of elastomeric meltblown fibers by flocking,
wherein the fibrous materials are selected from the group consisting of fibers and fiber bundles and are adhered to the pressure sensitive elastomer adhesive nonwoven web of elastomeric meltblown fibers while the pressure sensitive elastomer adhesive nonwoven web of elastomeric meltblown fibers is maintained in an elongated condition so that, upon recovery of the pressure sensitive elastomer adhesive nonwoven web of elastomeric meltblown fibers, the adhered fibrous materials are positioned closer together by the recovery of the pressure sensitive elastomer adhesive nonwoven web of elastomeric meltblown fibers.

27. The increased pile density composite elastic material of claim 26, wherein the pressure sensitive elastomer adhesive nonwoven web is a composite web comprising a mixture of meltblown fibers and one or more other materials selected from the group consisting of wood pulp, staple fibers, particulates and superabsorbent particles.

28. The increased pile density composite elastic material of claim 27, wherein the meltblown fibers include meltblown microfibers.

29. The increased pile density composite elastic material of claim 26, wherein the fiber bundles are selected from the group consisting of yarns and multifilament strands.

* * * * *